Figure 1:
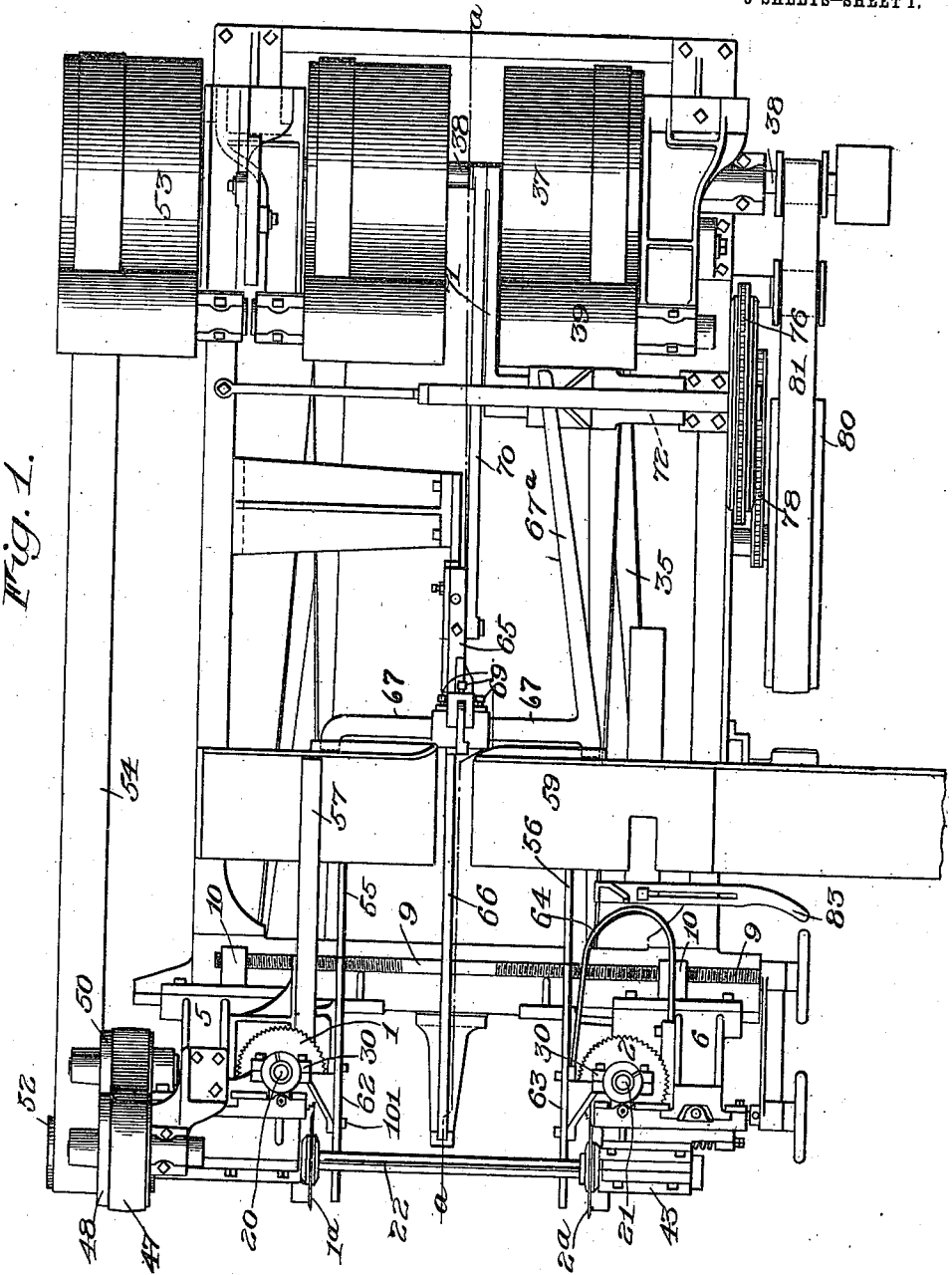

H. W. MORGAN.
CORNER TRIMMING MACHINE FOR BOXES AND THE LIKE.
APPLICATION FILED NOV. 18, 1907.

974,807.

Patented Nov. 8, 1910.

6 SHEETS—SHEET 1.

Witnesses
Walter B. Payne

Inventor
Henry W. Morgan
By Church & Pick
his Attorneys

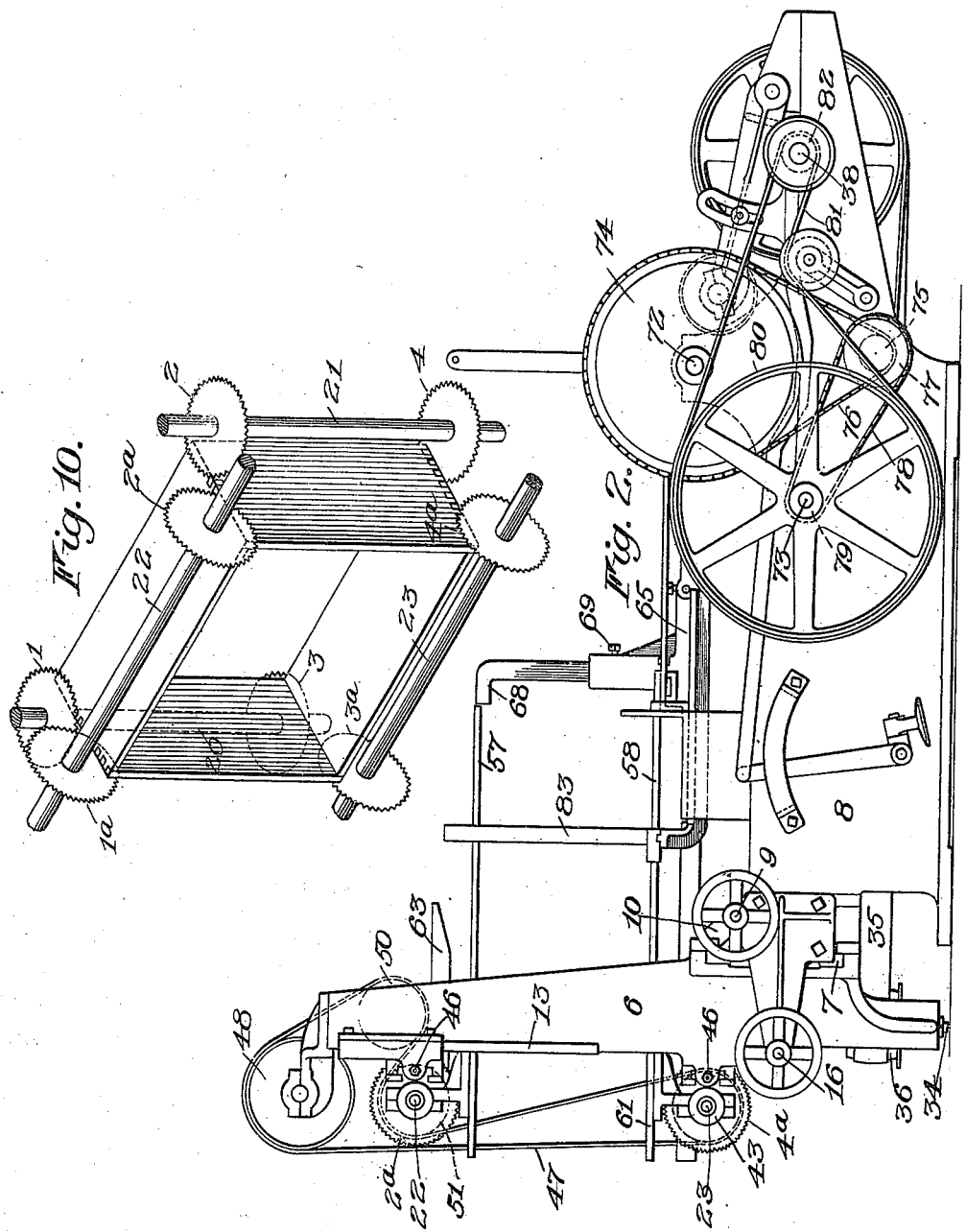

H. W. MORGAN.
CORNER TRIMMING MACHINE FOR BOXES AND THE LIKE.
APPLICATION FILED NOV. 18, 1907.
974,807.
Patented Nov. 8, 1910.
6 SHEETS—SHEET 3.
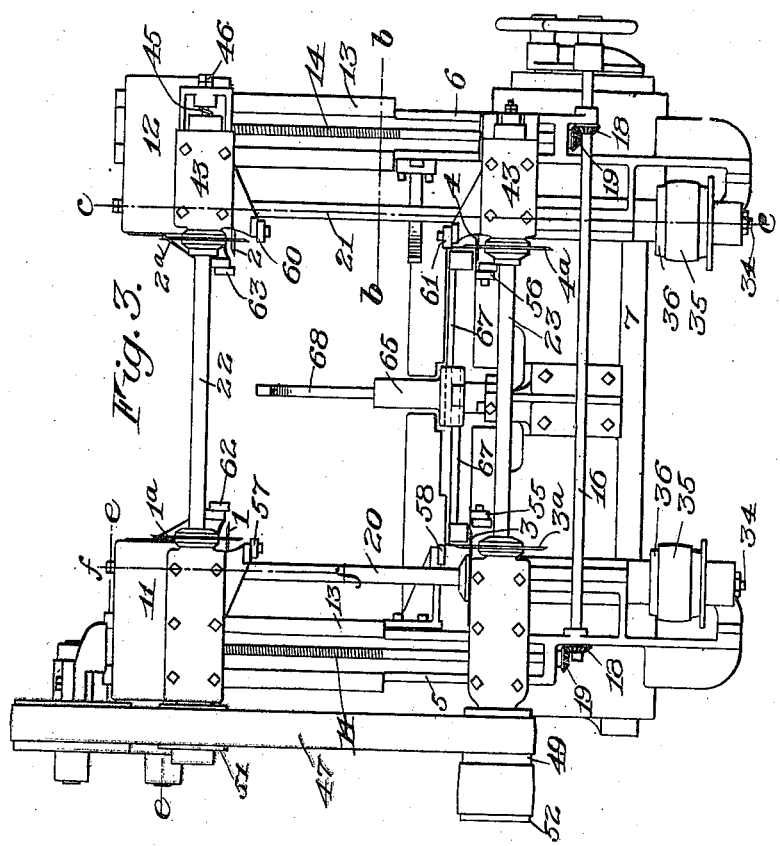

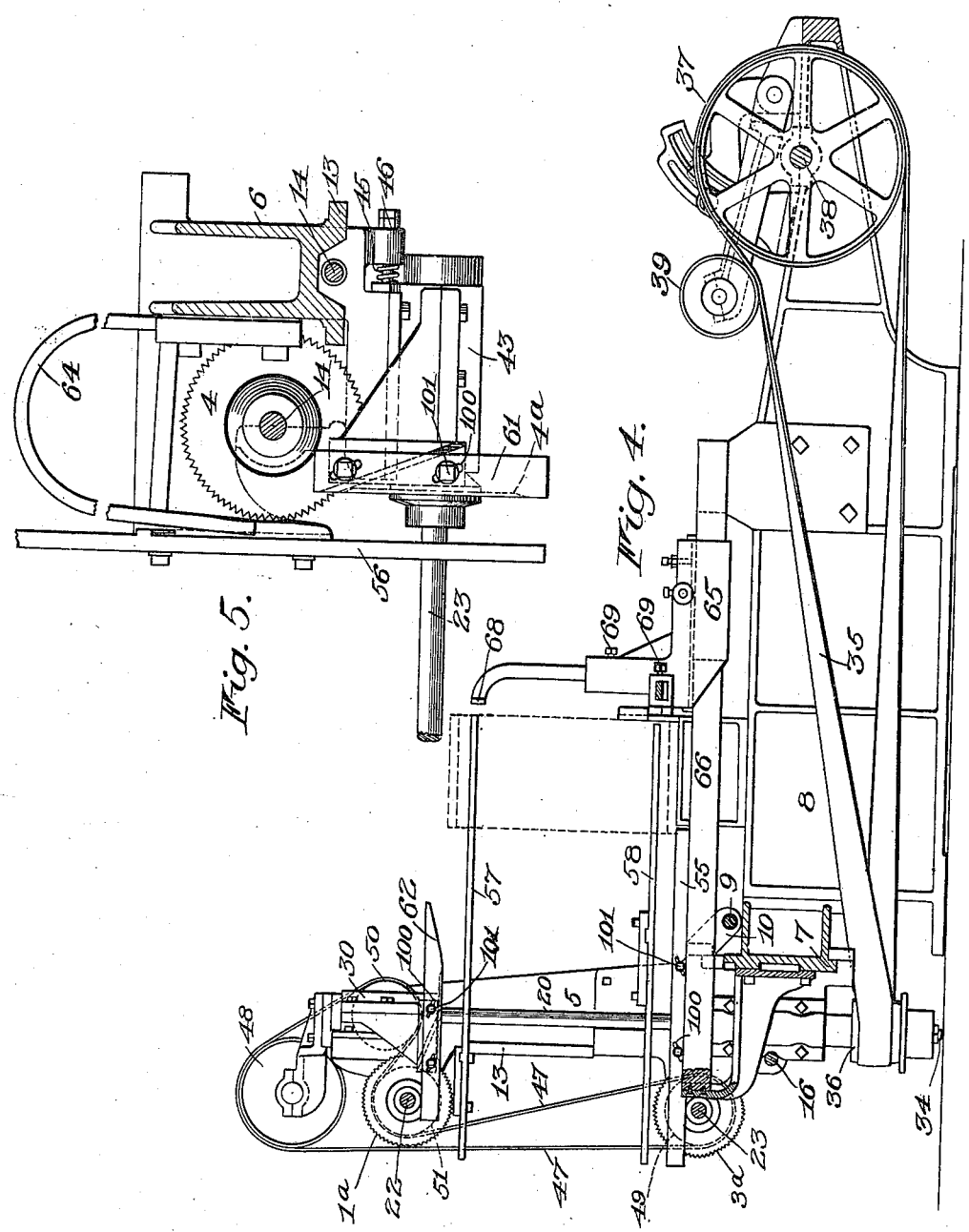

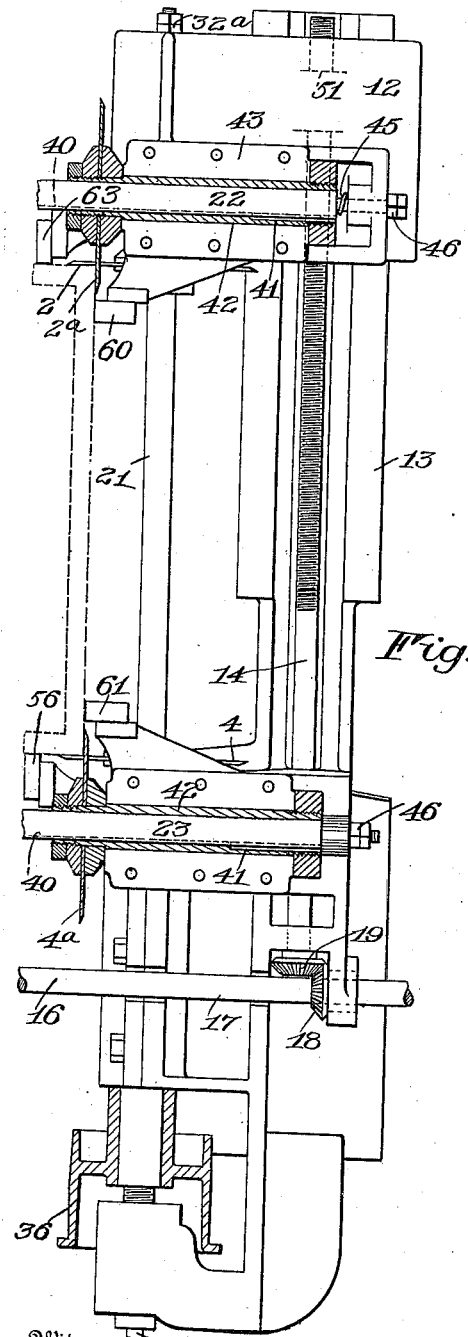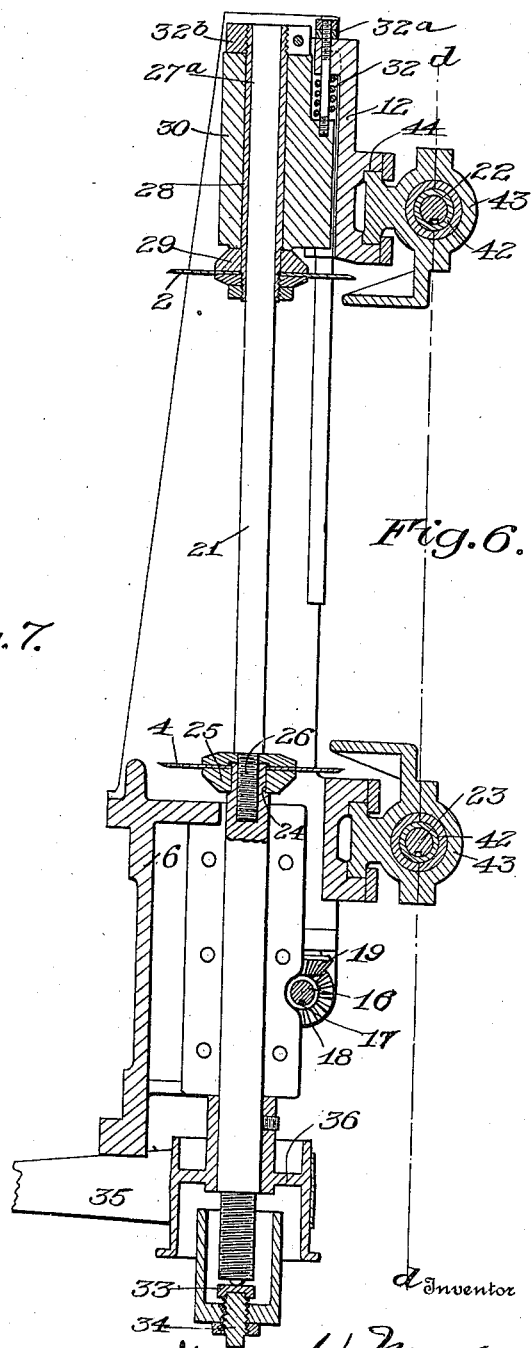

H. W. MORGAN.
CORNER TRIMMING MACHINE FOR BOXES AND THE LIKE.
APPLICATION FILED NOV. 18, 1907.
974,807.
Patented Nov. 8, 1910.
6 SHEETS—SHEET 6.
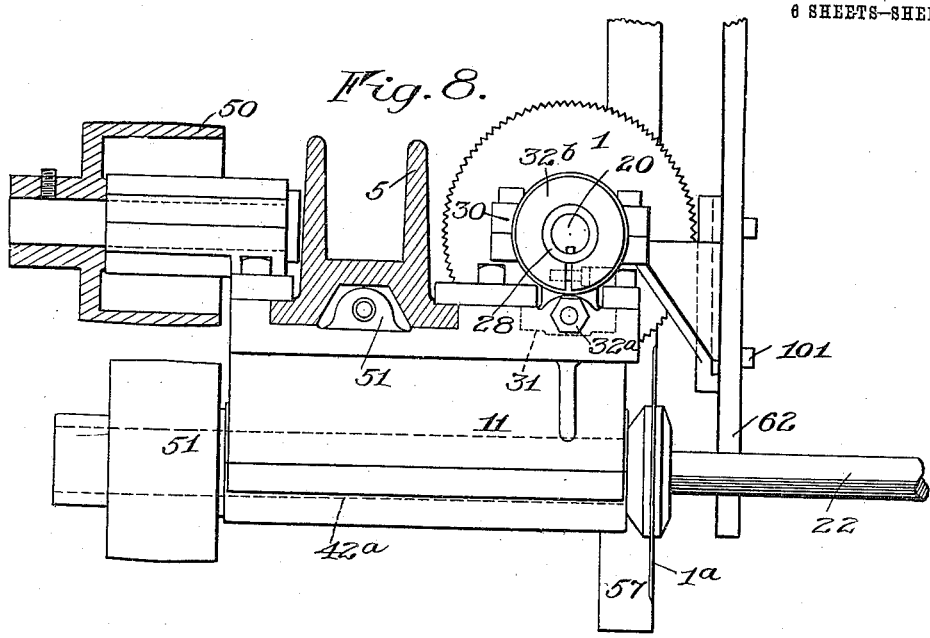
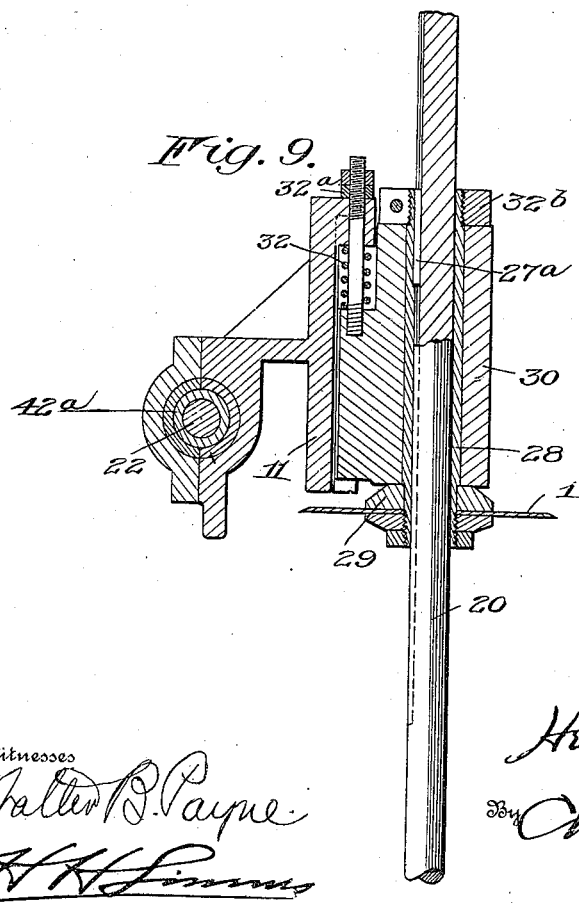
Witnesses
Walter B. Payne
H. H. Simms
Inventor
Henry W. Morgan
By Church & Rich
his Attorneys

UNITED STATES PATENT OFFICE.

HENRY W. MORGAN, OF ROCHESTER, NEW YORK.

CORNER-TRIMMING MACHINE FOR BOXES AND THE LIKE.

974,807.

Specification of Letters Patent.

Patented Nov. 8, 1910.

Application filed November 18, 1907. Serial No. 402,726.

*To all whom it may concern:*

Be it known that I, HENRY W. MORGAN, of Rochester, in the county of Monroe and State of New York, have invented certain new and useful Improvements in Corner-Trimming Machines for Boxes and the Like; and I do hereby declare the following to be a full, clear, and exact description of the same, reference being had to the accompanying drawings, forming a part of this specification, and to the reference-numerals marked thereon.

The present invention relates to machines for trimming the corners of wooden boxes and the like, and it has for an object to provide a construction in which the projecting portions formed by the usual mortise and tenon joints are simultaneously removed from all four corners of a box or the like in order to reduce labor in handling necessary when less than this number of corners are trimmed.

Another object is to provide for the adjustment of the machine to adapt it for boxes of any size within certain limits.

Still another object is to make provision for the automatic shifting of the cutters in order that boxes of slightly greater size than that for which the machine has been adjusted are not ruined by the cutters.

To these and other ends the invention consists in certain improvements and combinations of parts all as will be hereinafter more fully described, the novel features being pointed out in the claims at the end of the specification.

In the drawings wherein I have shown one embodiment of my invention: Figure 1 represents a plan view of the present embodiment; Fig. 2 represents a side view of the same; Fig. 3 represents a front view; Fig. 4 represents a section on line *a—a* of Fig. 1; Figs. 5 and 6 represent sections respectively, on lines *b—b* and *c—c* of Fig. 3; Fig. 7 represents a section on the line *d—d* of Fig. 6. Figs. 8 and 9 represent sections respectively, on lines *e—e* and *f—f* of Fig. 3; and Fig. 10 is a diagrammatic perspective showing the positions of the saws.
Similar reference numerals in the several figures indicate similar parts.

In order that the corners of a box or other article having four corners may be trimmed I employ cutters which operate simultaneously on all four corners. In the present embodiment these cutters, preferably in the form of rotary saws, 1, $1^a$, 2, $2^a$, 3, $3^a$, 4, $4^a$, are arranged in four pairs, the members of each pair operating in planes at right angles to each other, which causes their planes to intersect, necessitating the location of one member in advance of the other. Two pairs of the cutters are mounted directly above the other two pairs so that the boxes may be fed between them in a horizontal direction, the horizontal feed being preferred as a maximum output can thereby be obtained. The cutters may be adjusted for boxes of other or different sizes, and for this purpose it is preferred to employ a pair of relatively adjustable main carriers 5 and 6 which may be mounted on a horizontal guide 7 on a main frame 8, their simultaneous movement in opposite directions being effected by a suitable mechanism which in the present instance is in the form of a reversely threaded screw 9 journaled on the main frame and engaging nuts 10 on the carriers.

Arranged on the main carriers 5 and 6 are carriers 11 and 12, moved by a suitable mechanism preferably on vertical guides 13. The mechanism for moving the carriers may comprise a pair of screws 14 each journaled on one of the horizontally movable carriers 5 and 6 and turning in nuts 15 on the vertically movable carriers. These screws are simultaneously driven by a horizontally arranged shaft 16 journaled on the main frame, and have a sliding driving connection with the said shaft 16 which for this purpose is provided with a slot 17 in which slide feathers on bevel gears 18 meshing with like gears 19 on the lower ends of the screws. Each vertical movable carrier and the lower portion of each main carrier has arranged thereon a pair of the cutters before mentioned so that when the main carriers are moved away from or toward each other and the vertically movable carriers are adjusted, the machine will be adapted to operate on boxes of different sizes.

The cutters may be driven in any suitable manner, but it is preferred to employ two vertical shafts 20 and 21 for the horizontally operating cutters 1, 2, 3, 4, and two horizontal shafts 22 and 23 for the vertically operating cutters 1ª, 2ª, 3ª, 4ª. The vertical shafts 20 and 21 are journaled on the horizontally movable carriers and are composed preferably of two sections, the lower one having its upper end reduced at 24 to receive the holder 25 of a rotary saw, and the upper one having a depending screw threaded portion 26 which enters a pocket in the upper end of the lower section and clamps the knife holder. At the upper end of the upper section of the shaft the upper horizontally operating cutter is mounted to move in the direction of its axis, and at the same time to turn therewith, and for this purpose the upper cutter has a sleeve 28 extending upwardly from its holder 29 and carrying a feather 27ª working in a groove 27 in the shaft. The sleeves are secured to and turn in a support 30 which is yieldingly mounted on one of the carriers 11 or 12 moving on guides 31, or in other words, the cutter is mounted so as to move in the direction of its axis in order that when a box of slightly greater size, than that for which the machine is adjusted, passes between an upper and a lower horizontally operating cutter, one of them, in this instance the upper one, may move in the direction of its axis and thus prevent the box from being injured. A spring 32, or other yielding device, is interposed between the support and the carrier to hold the cutter in normal position, and a stop 32ª limits the downward movement at the cutter. A nut 32ᵇ serves to adjust the sleeve in its support and to take up for any wear, and step bearings 33, on which the lower ends of the shafts 20 and 21 rest, are adjustable by screws 34, in order to adjust the lower cutters. The driving of these shafts may be effected by a pair of belts 35 passing about pulleys 36 on the shafts and about drums 37 on a drive shaft 38, idlers 39 bearing on the belts so that sufficient friction will be produced.

The horizontal shafts 22 and 23 connect respectively the vertically movable carriers and the horizontally movable carriers. Each is provided with a longitudinal groove 40 in which a key 41 within a sleeve 42 at one end of the shaft works, each sleeve carrying one of the vertically operating cutters 2ª and 4ª, the cutters 1ª 2ª being carried by sleeves 42ª in which the shafts 22 and 23 are held against axial movement. The sleeves 42 are journaled in yieldingly mounted supports 43, each of which moves on a guide 44 and is pressed in one direction by a spring 45, a stop 46 serving to limit its movement in this direction. The driving of these horizontal shafts may be effected by means of a belt 47 which passes about a pulley 48 on a main carrier, about a pulley 49 on the sleeve 42ª of the lower shaft 23, and about an idler 50 on one of the vertically movable carriers, the idler being so disposed that it causes the belt to bear against a pulley 51 on shaft 22 at any position of the vertically movable carriers. A pulley 52 also arranged on shaft 23 is connected to a drum 53 on the drive shaft 38 by means of a belt 54.

For directing the boxes to the cutters, I employ a plurality of guides which bear on the boxes adjacent each cutter, and as it is desirable to employ devices coöperating with the box to effect the shifting of the supports of the cutters, I connect some of these guides to the yielding supports, but it is apparent that devices other than guides may be employed to coöperate with the box in order to control the position of the cutters. In the present instance the bottom guides 55 and 56 with the guides 57 and 58 on one side of the box extend from a lateral feed guide 59, while the side guides 60 and 61 and the upper guides 62 and 63 are shorter in order that the lateral feed may be permitted, a flat spring 64 engaging the box on the side of the short guides in order to prevent its shifting before reaching these guides. The guides 57, 63, 60 and 61 are connected to the movable supports 30 and 43 in order that the box may shift the cutters carried thereby when it is too large to pass onto the guides at their normal position. All of the guides are adjustable relatively to the cutters as by slots 100 and bolts 101 in order to present the box to the cutters in a proper manner.

Any suitable feeder may be employed for moving the boxes on the guides toward and past the cutters, the one shown in the present instance comprising a slide 65 movable on a way 66 and having laterally extending adjustable arms 67 and a vertically extending adjustable arm 68, the adjustment in this instance being secured by slidably arranging the arms in the slide 65 and securing them by screws 69. An arm 67ª extends rearwardly from the end of the arm adjacent the lateral feed 59 and acts as a stop to prevent the insertion of another box during the movement of the slide, this movement being effected by a pitman 70 which is connected to a crank arm 71 on a shaft 72, having a throw sufficient to carry the box past the cutters. Shaft 72 is driven from drive shaft 38 by a reducing gearing which may comprise a large gear 74 on shaft 72 connected to a pinion 75 on a stub shaft by a chain 76, pinion 75 being arranged to turn with a large pinion 77 which by a chain 78 is connected to a pinion 79 on shaft 73. Shaft 73 also carries a band wheel 80 which by a belt 81 is connected to a pulley 82 on the drive shaft 38.

In operation the cutters are adjusted to suit the boxes to be operated upon and on the starting of the machine, a box is fed into the path of the reciprocatory feeder on the lateral guide 59, an adjustable gage 83 being employed to properly guide the box. The feeder slowly carries the box over the guides toward the cutters, some of the guides, should the box be slightly too large, shifting the cutters which then operate on the box and trim the projecting portions.

A machine constructed in accordance with this invention reduces the labor required in manufacturing boxes or the like in which the side pieces are connected by mortise and tenon joints. The operation is such that the machine requires only unskilled labor to manipulate it and is not liable to become broken or otherwise inoperative.

I claim as my invention:

1. In a box trimming machine, the combination of four pairs of rotary saw cutters arranged to operate on four corners of a box, one pair being provided for each corner and having its members operating at right angles to each other, with guides for directing the box to the cutters.

2. In a box trimming machine, the combination of four pairs of rotary cutters arranged to operate on four corners of a box, one pair being provided for each corner, and having its members operating at right angles to each other, and mechanism for adjusting the cutters to permit them to operate on boxes of different sizes, with guides for directing the box to the cutters.

3. In a box trimming machine, the combination with four pairs of rotary cutters arranged to operate simultaneously on four corners of the box, two pairs being arranged above the other two pairs and each pair having its members operating at right angles to each other, of guides for directing the box to the cutters.

4. In a box trimming machine, the combination with a main frame, of carriers adjustable horizontally on the frame, a lower pair of rotary saw cutters fixed against vertical adjustment on each horizontally adjustable carrier, and having its members each crossing the plane of the other, upper cutter carriers vertically adjustable on the horizontally movable carriers, and an upper pair of rotary saw cutters carried by each vertically movable frame and having its members each crossing the plane of the other.

5. In a box trimming machine, the combination with a main frame, of a pair of carriers relatively adjustable on the frame, a pair of carriers each adjustable on one of the first named carriers, means for simultaneously adjusting the last named carriers, a pair of cutters on each of the last named carriers, each member of each pair crossing the plane of the other member, and a pair of cutters arranged on each of the latter, each member of each pair crossing the plane of the other member of said pair and fixed against adjustment toward the first named carriers.

6. In a box trimming machine, the combination with a main frame, of a pair of relatively adjustable main carriers thereon, a pair of carriers each adjustable on one of the main carriers, a pair of screws journaled on the main carriers and engaging the second named carriers, a shaft journaled on the frame and having a sliding driving connection with the screws, a pair of cutters arranged on each second named carrier, each member of each pair crossing the plane of the other member of the pair and a pair of cutters arranged on each main carrier and fixed against adjustment toward the cutters on the second named carriers each member of a pair crossing the plane of the other member of the pair.

7. In a box trimming machine, the combination with a main frame, of a pair of main carriers, a pair of carriers adjustable thereon, a shaft connecting the main carriers, rotary cutters mounted on the shaft to turn therewith and relatively movable in the direction of its axis, a shaft connecting the second-named carriers, rotary cutters mounted on said shaft to turn therewith and relatively movable in the direction of its axis, shafts connecting each main carrier and the carrier arranged thereon, and rotary cutters mounted on these shafts and carried by both carriers, those carried by the second named carriers each being movable in the direction of the axis of its shaft.

8. In a box trimming machine, the combination with a main frame, of a pair of main carriers, a pulley carried by one of them, a shaft connecting them having a pulley mounted thereon, rotary cutters carried by the shaft, a pair of carriers mounted on the main carriers, a shaft connecting them, having a pulley thereon, a pair of rotary cutters carried by the shaft, an idler mounted on one of the second-named carriers, and a belt passing about the pulley on the main carrier, the pulley on the shaft of the main carrier, the pulley on the shaft of the second-named carrier and the idler.

9. In a box trimming machine, the combination with a main frame, of a pair of horizontally movable carriers thereon, a pair of carriers vertically movable on the horizontally movable carriers, a horizontally arranged shaft journaled on the lower portion of the horizontally movable carriers, a pair of vertically operating rotary saws driven from said shaft and movable relatively to each other thereon, a horizontally arranged shaft journaled on the vertically movable carriers, a pair of vertically operating rotary saws secured to said shaft to turn therewith and movable relatively to each other thereon, vertically arranged shafts, one journaled on each horizontally movable carrier, and a pair of horizontally operating rotary saws carried by each vertically arranged shaft, the upper ones of which are arranged to slide on the shafts.

10. The combination with a shaft and a carrier adjustable longitudinally thereof and relatively thereto, of a support on the carrier yieldable in the direction of the axis of the shaft relatively to the carrier, and a rotary cutter carried by the support and secured to the shaft to turn therewith but to move axially thereof.

11. The combination with a carrier, of a second carrier adjustable relatively thereto, a shaft connecting the carriers, a support yieldable in the direction of the axis of the shaft on the adjustable carrier, a rotary cutter turning in the support and movable axially of the shaft but turning therewith, and a rotary cutter arranged on the shaft and the first named carrier.

12. The combination with a pair of main carriers, of a shaft connecting them, a rotary cutter mounted on the shaft and one of the carriers, a support yieldable in the direction of the axis of the shaft on the other carrier, a cutter turning in the support and slidable on the shaft, but turning with the latter, a second pair of carriers each adjustable on a main carrier, a shaft connecting each main carrier with one of the second named carriers, a rotary cutter mounted rigidly on each of the last named shafts and on a main carrier, a support yieldable on each of the second named carriers, and a cutter turning in each support and slidable on one of the last mentioned shafts but turning therewith.

HENRY W. MORGAN.

Witnesses:
G. WILLARD RICH,
RUSSELL B. GRIFFITH.